United States Patent [19]

Elion

[11] Patent Number: 4,473,599
[45] Date of Patent: Sep. 25, 1984

[54] PROCESS FOR PROVIDING OPTICAL FIBERS CONDITIONED FOR HOSTILE ENVIRONMENTS AND FIBERS THUS FORMED

[75] Inventor: Glenn R. Elion, Northborough, Mass.

[73] Assignee: Aetna Telecommunications Laboratories, Westboro, Mass.

[21] Appl. No.: 382,698

[22] Filed: May 27, 1982

[51] Int. Cl.³ .......................... G02B 1/10; G02B 5/14
[52] U.S. Cl. ..................... 427/163; 65/3.11; 65/3.2; 350/96.29
[58] Field of Search ................ 427/163; 65/3.11, 3.22; 350/96.29

[56] References Cited

U.S. PATENT DOCUMENTS 2,893,895 7/1959 Claussen .
3,540,870 11/1970 Li .
4,118,211 10/1978 Au Coin et al. ................ 427/163 X
4,183,621 1/1980 Kao et al. .
4,243,298 1/1981 Kao et al. .

Primary Examiner—Norman Morgenstern
Attorney, Agent, or Firm—Weingarten, Schurgin, Gagnebin & Hayes

[57] ABSTRACT

A process for manufacturing an optical fiber having a ceramic coating applied at the preform stage or drawn fiber stage wherein the coating hermetically seals the fiber against penetration of environmental gases and fluids and increases the fiber tensile strength, and a fiber produced by the process. An optical fiber preform, from which a fiber is to be drawn, preferably after a preliminary cleaning and drying, is coated with a ceramic layer by reacting hot gaseous compounds of tin or titanium with chlorine, bromine or iodine and water or hydrogen peroxide, typically with nitrogen or oxygen carrier gases. The reaction produces a thin ceramic preform coating of one or more layers of an oxide of tin, titanium, or tin with titanium. The thus coated preform is drawn to the dimensions of a desired optical fiber. The drawn fiber may itself be coated, typically in an on-line process fed directly from a drawing furnace, and comprising one or more reaction zones which apply a further or initial ceramic layer to the fiber. The thus coated or multiply coated fiber is typically buffer coated. Prior to the application of the buffer coating, the bonding between buffer and ceramic is improved by the application of a coupling enhancement compound.

24 Claims, 7 Drawing Figures

PROCESS FOR PROVIDING OPTICAL FIBERS CONDITIONED FOR HOSTILE ENVIRONMENTS AND FIBERS THUS FORMED

FIELD AND BACKGROUND OF THE INVENTION

Optical fibers are finding increasing applications for information communication and as the area for their use expands, demands are placed upon such optical fibers to withstand the stresses of ever more hostile environments, such as the high temperatures and/or pressures encountered in well logging cables, deep ocean conditions, or chemically corrosive atmospheres. Optical fibers are thus being demanded that exhibit higher durability both in strength as well as in protection against environmental conditions.

Various coatings have been proposed as additions to optical fibers aimed at providing an increase in their durability and environmental protection. Among these are layers of metals such as aluminum, indium, tin, gold, tungsten, titanium, zirconium, molybdenum, and metal alloys. Such metal coatings, however, have the undesirable property of conducting both heat and electricity and do not provide adequate long term protection against hostile environments, such as those represented by the well logging and deep ocean applications.

Plastic coatings including those of kevlar, teflon, ultra-violet setting epoxies, laquers, and nylon have also been used for optical fiber coatings. Such plastics alone are inadequate as barriers against water penetration under conditions of high pressure or temperature.

Ceramic coatings have also been proposed for optical fibers particularly to improve the fiber tensile strength. These ceramics, typically applied in on-line processing, also pose substantial difficiencies. Among these is a tendency of such ceramic coatings to dissolve at elevated temperatures and pressures in the presence of acids and bases. In addition, ceramic coatings often possess expansion coefficient which mismatch those of the fiber so that cracks in the coating develop, particularly from repeated temperature or pressure cycling.

An additional problem encountered with optical fiber coatings in general is that they lead to reduced adhesion between the fiber coating and subsequently applied plastic buffers, whether applied over ceramic, metllic or nonmetallic coatings. This low adhesion is not always desirable, since it eventually will lead to the creation of pockets or bubbles between the fiber and the buffer where adhesion has been lost between those layers.

SUMMARY OF THE INVENTION

In accordance with the teaching of the present invention, a process is provided for fabricating an optical fiber with a coating that substantially increases fiber durability by increasing tensile strength and providing a hermetic seal against attack by environmental substances, even under conditions of high temperature and pressure. The process for providing such a fiber starts with a fully formed optical fiber preform or mandrel from which the ultimate fiber is created by a drawing furnace. The preform is preferably precleaned by a washing and drying process, which may include an acid induced micro-etch of the preform surface. The thus cleaned preform is then exposed to a hot reactive environment typically within a rection tube of a high temperature furnace. Within the reactive atmosphere surrounding the preform, compounds of tin or titanium with chlorine, bromine, iodine or combinations are reacted by pyrolysis or hydrolysis to produce a tin oxide, titanium oxide or mixtures thereof, which coat the surface of the preform. In a typical reaction, the tetrachloride of either tin or titanium is hydrolized with water to produce a corresponding oxide that develops a layer on the preform, with hydrochloric acid as a by-product. An elevated temperature, typically in the range of 300° C. to 600° C., forms the thermal environment for such a reaction. The preexisting preform is typically of a high purity pyrex or quartz composition which can be readily cleaned prior to coating. In addition, the reactant gases applied at high temperature to the environment of the preform are preferably scrubbed in advance of their introduction to the reaction area.

The preform is coated for a predetermined interval of time depending upon the thickness of coating, desired, typically in the range of nanometers to millimeters. Once coated, the preform is subjected to high temperature drawing in a furnace which gradually decreases the preform diameter while extending its length until the desired diameter of the optical fiber, typically in the range of 100 to 300 micrometers, is reached.

The drawn fiber may then be coated with a buffer suitable for its intended use. Prior to the coating of the buffer, an adhesion enhancing spray is applied to the fiber so as to reduce the likelihood of bubbles or voids appearing between fiber and buffer.

Prior to receiving a buffer layer, the drawn fiber, with or without a prior coating at the preform stage, may receive a further ceramic coating. This further coating is typically applied in an on-line processing which receives a hot drawn fiber directly from the drawing furnace and applies it on a continuous feed basis to a one or more zone reaction chamber. The same reactants used with the preform may be used for the on-line coating process. A number of reaction zones can be used according to the mixtures of ceramic components to be coated. A final zone may be used as a hot air purge for reactant gases before the fiber exits the reaction chamber.

The final ceramic coating on the fully processed fiber is typically in the range of 0.1 to 10.0 micrometers to provide an unapertured layer and hermetically seal the fiber. By ceramic coating the preform first, layers in excess of one micrometer can be achieved with a significant increase in fiber durability and environmental protection.

BRIEF DESCRIPTION OF THE DRAWING

These and other features of the present invention are more fully set forth below in the solely exemplary detailed description and accompanying drawing of which.

DETAILED DESCRIPTION OF THE DRAWING

The present invention contemplates a process for producing improved optical fibers by increasing their tensile strength and increasing their resistance to environmental attack. The invention also applies to the fibers produced by such a process.

Figure 1A:
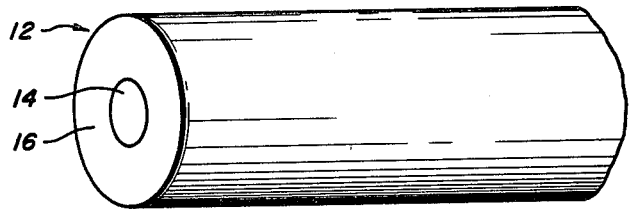
FIGS. 1A–1D perspectively illustrate the stages of optical fiber formation from preform to buffered fiber according to the present invention.

In accordance with the invention, the improved fibers are produced, beginning with a fiber preform 12 illustrated in FIG. 1A. The preform 12, or mandrel as it is often termed, represents a cylinder of glass having dimensions which may typically range from 10 to 40 mm in diameter and 500 to 2000 mm in length. The mandrel 12 is a completed glass cylinder suitable for drawing through a fiber optic drawing furnace into the final dimensions of an optical fiber which, after the provision of suitable coatings and encasings becomes a fiber optic cable adapted to transmit vast numbers of channels of information modulated light. The preform 12 is typically a body of glass to which one or more dopant materials have been added in order to achieve a desired optical property for transmission of the information modulated light. The preform 12 also typically includes a central core portion 14 having a higher index of refraction than a peripheral cladding 16.

Figure 1B:
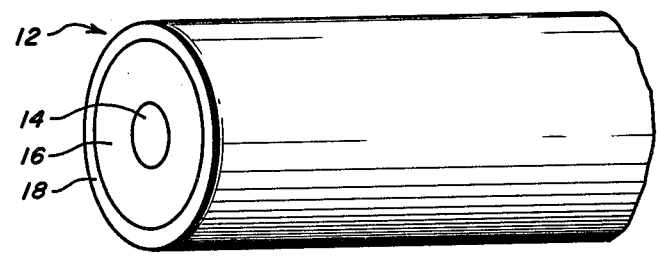

The already existing preform 12, in lieu of being drawn directly into a fiber, may be first provided with a coating 18 around its outer circumference as illustrated in FIG. 1B. The coating 18 is a thin ceramic layer, typically in the range of a few nanometers to several millimeters depending upon the ultimately desired fiber properties.

Figure 3:
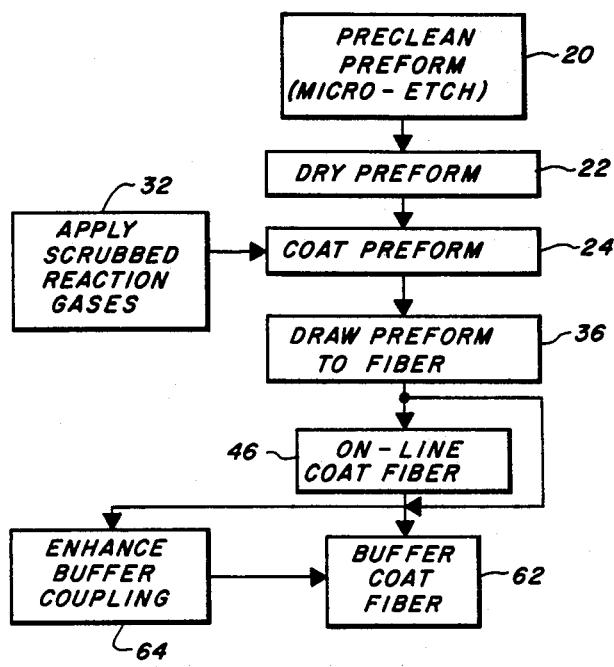
FIG. 3 is a diagram of an algorithm illustrating preform and fiber processing steps in accordance with the present invention.

Before application of the layer 18, using the process of FIG. 3, it may be desirable to preclean the preform 12 in a step 20. The precleaning step 20 typically includes a washing in a bath of acid, such as hydrofluoric acid. Subsequent to the washing step, a drying step 22 typically subjects the washed preform to drying in a hot, dry nitrogen atmosphere or an atmosphere of compounds that react with water, such as thionyl chloride or hydrogen chloride vapor. In the process of being cleaned and dried by steps 20 and 22, the preform is also typically micro-etched which enhances surface mixing of the deposited ceramic layer 18 during subsequent drawing steps.

Figure 2:
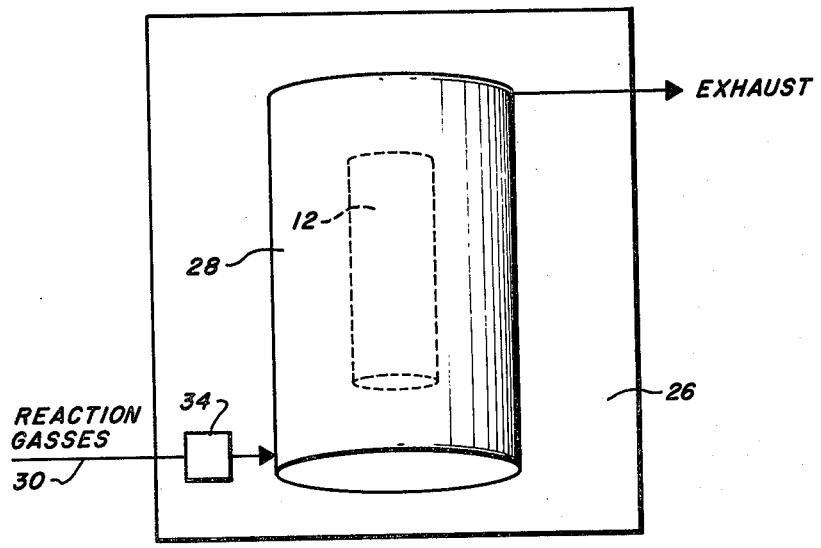
FIG. 2 is a schematic diagram of a chamber for coating a fiber preform in accordance with the present invention.

The actual application of the ceramic layer 18 is accomplished in a step 24 which typically takes place within a high temperature furnace 26 as illustrated in FIG. 2. The furnace 26 contains a reaction tube 28 within which the preform 12 is placed. A stream 30 of reaction gases is applied to the environment within the reaction tube 28. This environment is maintained at a temperature typically in the range of 300° C. to 600° C. At this temperature, spontaneous reactions typically occur within the reaction gases causing the deposition of a ceramic layer on the preform 12.

The reaction gases applied in the stream 30 are typically subjected to a scrubbing step 32, illustrated in FIG. 3, which may consist of a sodium hydroxide vapor to liquid process. It is also desirable that the environment of the furnace 26 be thoroughly cleaned prior to each coating operation.

The reaction gases typically include compounds of tin and titanium with chlorine, bromine, or iodine which are reacted by pyrolysis to yield the desired ceramic coating or by hydrolysis with water or hydrogen peroxide to the same effect. A range of typical starting compounds includes: $SnCl_4$, $SnCl_3Br$, $SnCl_2Br_2$, $SnClBr_3$, $SnBr_4$, $SnCl_2I_2$, $SnBr_2I_2$, $SnI_4$, $TiCl_4$, $TiBr_4$, and similar compounds. While specific examples are provided below, typical reactions proceed as follows:

$$SnCl_4 + 2H_2O = SnO_2 + 4HCl;$$
$$TiCl_4 + 2H_2O_2 = TiO_2 + 4HCl + O_2.$$

Hydrogen or nitrogen are typically used as carrier gases to feed the tin and titanium compounds to the reaction zone within the reaction tube 28. The feed gas temperature and flow rates are controlled in accordance with the desired depositions.

During the coating operation, particulates and impurities in the environment are removed from the reaction tube 28 by in-line submicron teflon filters 34 which are located in the gas feed lines to the reactor. The reaction tube 28 is preferably fabricated of pyrex or quartz in order to accomodate the environment of corrosive gases and to provide suitable cleanability.

During the coating step 24, a ceramic layer 18 will form at a rate dependent upon the process controls exercised in the feed and circulation of the reaction gases and environmental temperature. This process is continued for a period of time specified by the ultimately desired thickness of the ceramic layer 18.

Figure 1C:
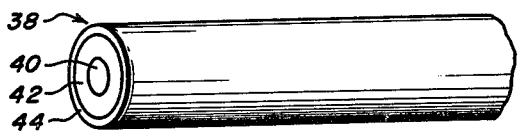
Figure 1D:
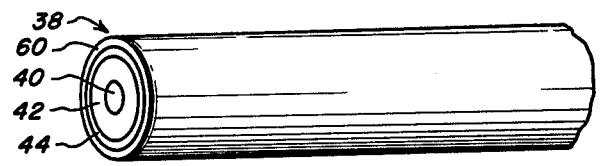

At the end of the application of the ceramic layer 18, the fully coated preform 12 is removed from the furnace and, in a step 36 drawn into the final dimensions, of an optical fiber 38, as illustrated in FIG. 1C. The drawing operation, may use a conventional drawing furnace to narrow and elongate the fiber to its final dimensions, typically in the range of 100 to 300 micrometers. The drawn fiber will include a core 40, cladding 42 and exterior ceramic layer 44 all proportionately reduced in dimensions.

Figure 4:
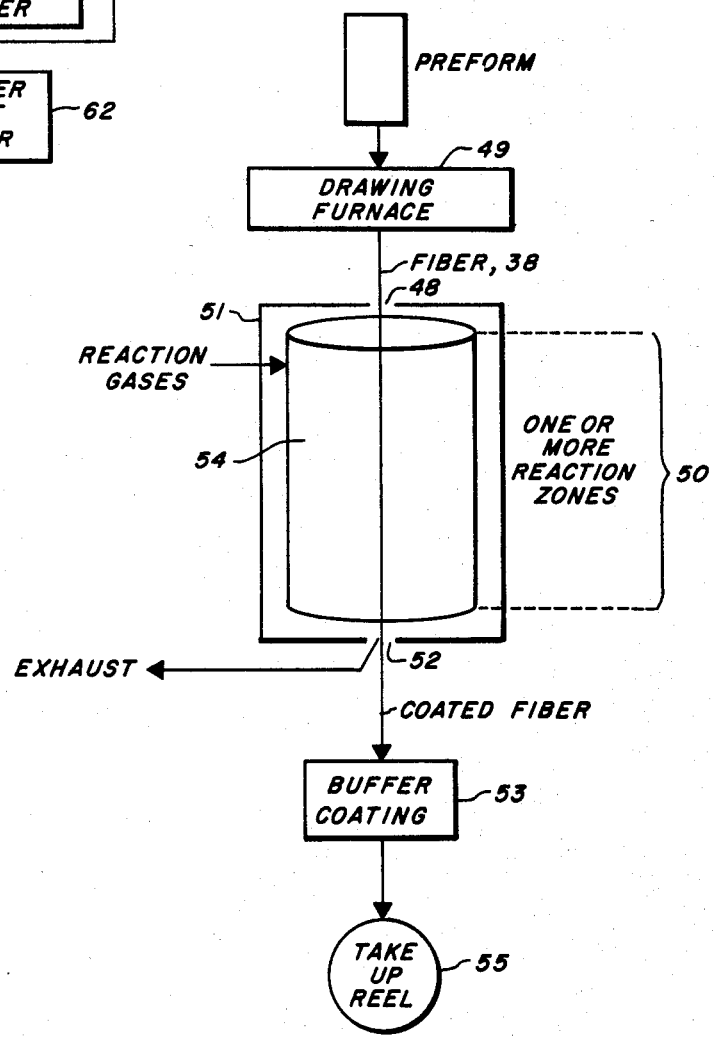
FIG. 4 is a diagram illustrating on-line fiber coating in accordance with the present invention.

The drawn fiber 38 may be given a further coating in an on-line ceramic coating step 46 illustrated in FIG. 3, or a fiber, not precoated, may be subsequently coated in the on-line step 46. The coating process can use the same reactions illustrated above for coating the preform 12. The coating apparatus typically employs an on-line furnace illustrated in FIG. 4 in which the still hot fiber 38 from a drawing furnace 39 is applied through an entrance slit 48 of an on-line coating furnace 51 to a region 50 comprising one or more reaction zones which produce a desired ceramic coating. The coated, drawn fiber 38 typically exits the region 50 through an exit slit 52. The fiber 38 feeds through the region 50 within a quartz or pyrex reaction tube 54. The exiting fiber 38 is typically fed to a buffer coating system 53 discussed below, and finally to a take-up reel 55.

Gases within the reaction zones 50 may be exhausted through the slits 48 and 50 with a vacuum system followed by a caustic scrubber.

The region 50 may include a single reaction zone in the case of a single material deposition. For application of coatings of varying mixtures, a multi-zone furnace is typically used with each zone heating a distinct region of the quartz or pyrex reaction tube 54.

The on-line coating step 46 is utilized to produce a final coating in the range of 0.1 to 10 micrometers which is generally found sufficient to produce a pinhole free layer 44 in the ultimately formed cable. Relatively thick layers, above 1 micrometer, can be achieved in the final on-line coating step 46 where the preform has been previously coated in the process described above.

Subsequent to the fiber coating step 46, the fiber can be coated in a step 62 with a buffer, such as a plastic layer 60, on top of the ceramic layer 44. Preferably, prior to buffer coating step 62, the fiber is sprayed with a coupling enhancer in a step 64, such as by application of a layer of tetraisopropyl titanate. Subsequently an ultra-violet curable epoxy acrylate is applied and cured to form the buffer layer 60 in step 62. The coupling agent helps to exclude moisture penetration between the fiber and buffer 60 and prevents the formation of voids between the two layers with repeated temperature and pressure cycling.

Typical examples of preform and fiber coating steps in accordance with the present invention are illustrated below.

EXAMPLE #1

A 20 mm diameter optical fiber preform, 1000 mm in length, is placed in a quartz reactor tube, 1500 mm in length. The reactor tube is centered in a split-tube furnace and preheated to 500° C. Tin tetrachloride (SnCl$_4$) is fed into the reaction chamber using an oxygen carrier gas. Hydrogen peroxide (H$_2$O$_2$)is simultaneously fed into the reaction chamber using dry nitrogen as a carrier gas. The deposition rate of tin oxide under these conditions is about 1 micrometer per minute. Deposition is allowed to continue to a desired thickness.

The preform is subsequently fed into a high temperature drawing furnace with an on-line reaction chamber approximately two meters in length positioned to receive the drawn fiber for further coating. The reaction chamber is heated by two tandem three-zone high temperature split tube ovens. Once the drawing process has begun, tin tetrachloride (SnCl$_4$) is fed into the first reaction zone at 500° C. Hydrogen peroxide is fed into the second reaction zone at 550° C. with a nitrogen carrier gas. Vacuum is applied to the reaction chamber to create a constant flow of reactant gases concentric about the heated, drawn fiber. Dry air pre-heated to 1000° C. is fed into the last zone of the reaction chamber to purge residual water vapor and reactant gases. After leaving the reaction chamber, the oxide coated fiber is coated with an ultra-violet curable polymer.

Testing of the finished, uncabled fiber showed nominal changes in optical or physical parameters after exposure to autocalve testing in water while untreated fibers with the same buffer material showed noticable signs of degradation, demonstrated by surface crack propagation and solubility of the glass.

EXAMPLE #2

A fiber preform is pretreated as in Example #1 except that after the tin oxide coating is applied a coating of titanium oxide is applied by a similar process. Titanium oxide has a lower water solubility than tin oxide and is advantageous in applications where prolonged exposure to water, acids or bases is expected.

After the preform is coated, it is inserted into the drawing furnace and drawn to the dimensions of the desired fiber. A layer of tyzor (tetraisopropyl titanate) is sprayed onto the drawn fiber prior to coating the fiber with an ultra-violet curable epoxy acrylate.

The above described process and resulting product achieve an enhancement in optical fibers by increasing their tensile strength and raising their environmental immunity. The benefits of this invention may be achieved in other specific ways within the scope of the invention, as specified in the following claims.

What is claimed is:

1. A process for providing a coating on an optical fiber comprising:
   providing a glass preform of the type adapted to be drawn into an optical fiber;
   reacting by pryolysis or hydrolysis material selected from the group comprising compounds of tin with chloride, bromium, iodine or combinations thereof and titanium with chlorine and bromine;
   coating said preform with an oxide of tin or titanium resulting from said reacting step;
   drawing the coated preform into the dimensions of an optical fiber having thereon the oxide coating of an oxide of tin or titanium.

2. The method of claim 1 wherein said providing step includes the step of precleaning said preform.

3. The process of claim 2, wherein said precleaning step includes the step of washing said preform in an acid bath.

4. The process of claim 3 further including the step of drying the washed preform.

5. The process of claims 3 or 4, wherein said washing step includes the step of washing in a hydrochloric acid solution.

6. The process of claim 4, wherein said drying step includes the step of drying by application of hot dry nitrogen or compounds reactive with water.

7. The process of claim 6, wherein said compounds reactive with water are selected from the group consisting of thionyl chloride and hydrochloric acid vapor.

8. The process of claim 1, wherein said material is reacted with a compound selected from the group consisting of water and hydrogen peroxide to form said oxide coating.

9. The process of claim 8, further including applying a carrier gas selected from the group comprising nitrogen and hydrogen to feed said compounds to said preform.

10. The process of claim 9, further including the step of controlling the feed rate of said carrier gas.

11. The process of claim 9, further including the step of scrubbing said carrier gas prior to the application thereof to said preform.

12. The process of claim 1, further including the step of controlling the temperature of the environment of said preform.

13. The process of claim 12, wherein said temperature is controlled in the range of 300° C. to 600° C.

14. The process of claim 1, wherein said coating step includes the step of applying a plurality of oxide layers to said preform.

15. A process for providing a coated optical fiber comprising:
    providing a glass preform of the type adapted to be drawn into an optical fiber;
    reacting by pyrolysis or hydrolysis material selected from the group comprising compounds of tin with chloride, bromium, iodine or combinations thereof and titanium with chlorine and bromine;
    coating said preform with a first coating of an oxide of tin or titanium resulting from said reacting step;
    drawing the coated preform into the dimensions of an optical fiber having thereon the oxide coating;
    applying a second coating on-line to the fiber drawn from said first coated preform.

16. The process of claim 15 wherein said applying step includes the step of leading the fiber through a multizone reaction chamber.

17. The process of claim 16, wherein the applying step includes applying hot compounds of tin or titanium into a first reaction zone, applying a compound selected from the group consisting of water and hydrogen peroxide to a second reaction zone and applying preheated dry air to a final reaction zone of said reaction chamber.

18. The process of claim 17, wherein said compound is tin tetrachloride at a temperature of approximately 500° C., the compound applied to said second zone is hydrogen peroxide at a temperature of approximately 550° C., and the preheated air is heated to approximately 1,000° C.

19. The process of claim 18, wherein the hydrogen peroxide is applied with a nitrogen carrier gas.

20. The process of claims 18 or 19, further including the step of applying a vacuum to said reaction chamber to create a constant flow of reactant gases concentric about the fiber.

21. The process of claim 1 or 15, further including the step of applying a coupling enhancement compound to said fiber.

22. The process of claim 21, further including the step of applying a buffer coating of a plastic material to said fiber.

23. The process of claims 1 or 15, wherein said first and or second coating has its thickness in the range of several nanometers to several millimeters.

24. The process of claims 1 or 15, further including the step of applying a buffer coating to said fiber.

* * * * *